May 28, 1968          T. G. HARE          3,385,560
PLASTIC WASHER HOLDER FOR FAUCET VALVE
Original Filed July 21, 1965          2 Sheets-Sheet 1
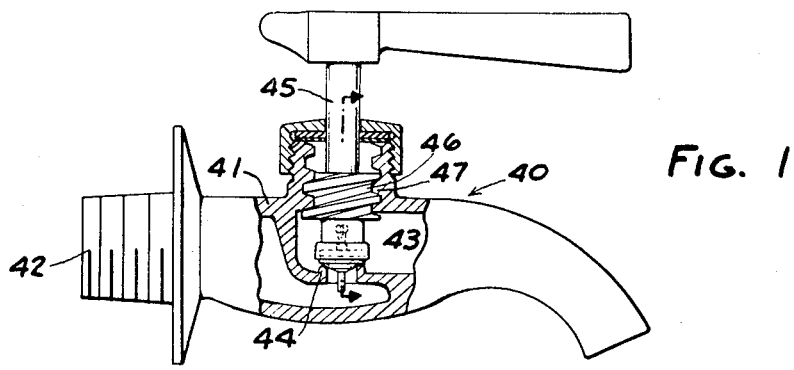
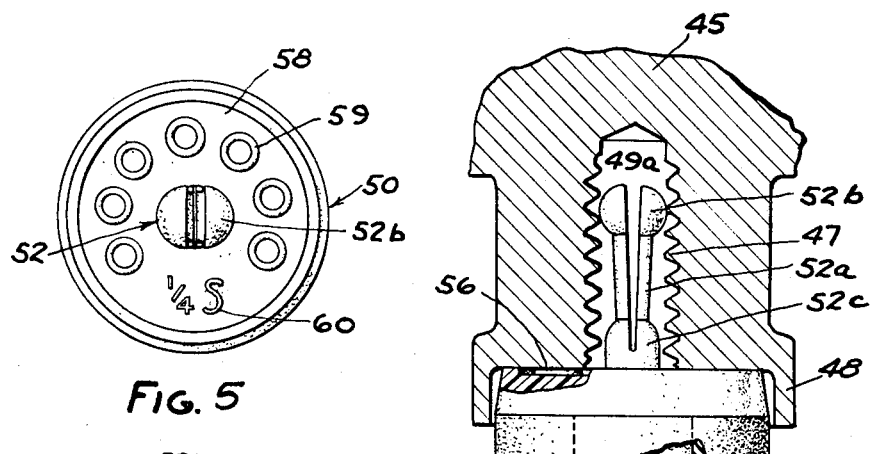
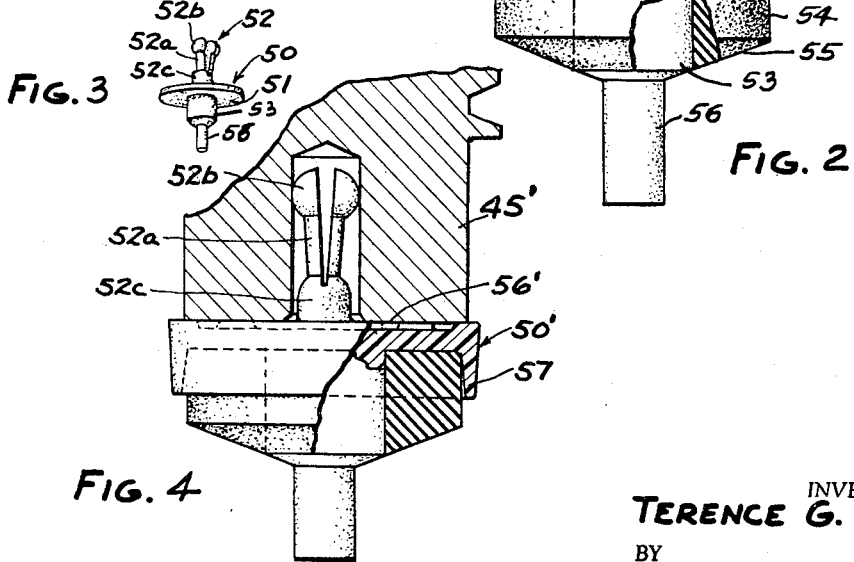
INVENTOR.
TERENCE G. HARE
BY
Barnes, Kisselle, Raisch & Choate
ATTORNEYS United States Patent Office 3,385,560
Patented May 28, 1968

3,385,560
PLASTIC WASHER HOLDER FOR
FAUCET VALVE
Terence G. Hare, Union Lake, Mich., assignor to Water-Miser Inc., Phoenix, Ariz., a corporation of Michigan
Continuation of application Ser. No. 473,720, July 21, 1965. This application Sept. 14, 1966, Ser. No. 579,437
6 Claims. (Cl. 251—88)

ABSTRACT OF THE DISCLOSURE

The faucet valve disclosed herein comprises a faucet body having an inlet and outlet passage and a valve seat at the area of juncture of the passages. The faucet valve further includes a valve body that is mounted for movement toward and away from the seat and a washer holder made of relatively incompressible plastic material is rotatably mounted in an axial threaded opening in the valve body. The washer holder has an integral central flange and integral axial projections extending from the flange. One of the projections is bifurcated and has upper enlarged ends, intermediate ends of lesser cross section and lower ends of greater cross section joined in an enlarged portion. The other of the axial projections has a shoulder thereon and a resilient washer is telescoped over said last-mentioned axial projection and is retained thereon by the shoulder.

---

This application is a continuation of my copending application Ser. No. 473,720, filed July 21, 1965 and now abandoned, which in turn is a continuation-in-part of my copending application Ser. No. 279,762, filed May 13, 1963, and now abandoned.

This invention relates to faucet valves and particularly to such valves wherein the washer that provides the seal is supported by a member rotatably mounted and movable axially to bring the washer into and out of engagement with the valve seat.

In my prior patent, U.S. No. 2,879,025, issued Mar. 24, 1959, entitled "Faucet with Ball Bearing Mounted Seal," there is disclosed a washer holder that is rotatably mounted on a valve body which, in turn, is movable toward and away from the valve seat. As shown in this patent, the washer holder is rotatably mounted on the valve body by a plurality of segments which extend upwardly through an opening in the lower end of the washer holder and are deformed outwardly into engagement with the sides of a circular recess. Ball bearings are interposed between the lower end of the valve body and the washer holder to provide a low friction bearing between the valve body and the washer holder. Although very effective, the provision of ball bearings necessitates a high cost, both of materials and labor in assembly. In addition, the materials must be selected such that a minimum of corrosion occurs, further adding to the cost of the materials.

In my copending application Ser. No. 185,425, filed Apr. 5, 1962, titled, "Faucet Valve," of which this application is a continuation-in-part, there is disclosed and claimed a valve structure wherein the entire washer holder is made of organic plastic material having low friction properties and the valve body and washer holder have complementary annular bearing surfaces so that the use of a separate bearing member is entirely eliminated.

It is an object of this invention to provide an improved faucet valve which eliminates the necessity for a separate bearing.

It is a further object of this invention to provide a faucet valve that has a minimum of friction.

It is a further object of the invention to provide such a faucet valve which has a minimum tendency toward corrosive action.

It is a further object of the invention to provide such a faucet valve that is low in cost and easy to manufacture.

It is a further object of the invention to provide a washer holder that can be utilized with conventional faucet valves to provide the advantages of a rotatable swivel connection between the washer and the valve body and, at the same time, obviate any tendency to corrosive action due to metal-to-metal contact.

It is a further object of the invention to provide such a washer holder which has low initial cost.

It is a further object of the invention to provide such a washer holder which can be inserted without the use of tools.

It is a further object of the invention to provide a washer holder which can be utilized in connection with new faucet valves to provide a swiveling connection without corrosive action.

It is a further object of the invention to provide such a washer holder for use with new faucet valves which is low in cost and which can be installed without the use of tools.

It is a further object of the invention to provide such a washer holder which utilizes conventional resilient rubber washers.

Basically, the invention comprises making the entire washer holder of a relatively incompressible organic plastic material that has low friction properties, such as Delrin, and providing a bearing seat on the valve body and a complementary bearing surface on the washer holder.

In accordance with the invention, an axial projection on the washer holder is bifurcated and frictionally engages the sides of an axial opening in the valve body. In another form, the axial projection on the washer holder is provided with a portion of reduced diameter and a C-shaped spring element is provided which has a slightly greater diameter than the minimum internal diameter of the axial opening so that the spring element axially retains the washer holder in position on the valve body.

The organic plastic material, of which the washer holder is made, is inert to chemical action and electrolytic action with the chemicals that are conventionally used in the treatment of water, is abrasive resistant, has minimum tendency for cold flow and is relatively incompressible and rigid.

In the drawings:

FIG. 1 is an elevation, partly in section, of a form of faucet valve embodying the invention.

FIG. 2 is a fragmentary sectional view, on an enlarged scale, taken along the line 2—2 in FIG. 1.

FIG. 3 is a perspective view of a washer holder embodying the invention.

FIG. 4 is a fragmentary sectional view similar to FIG. 2 of a modified form of faucet valve.

FIG. 5 is a top end view of the washer holder shown in FIG. 3.

Figure 6:
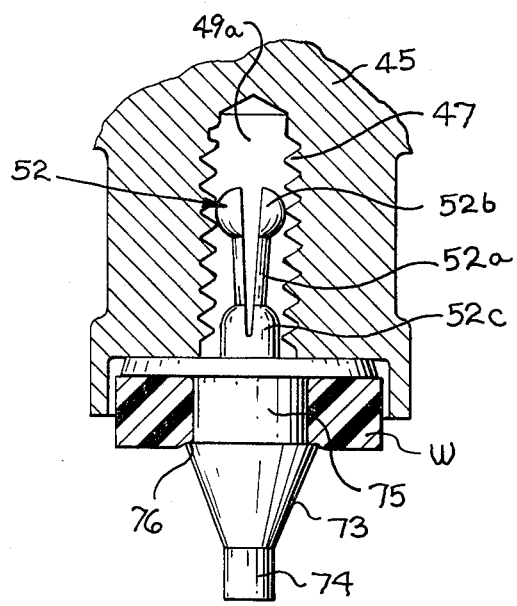
FIG. 6 is a fragmentary sectional view similar to FIGS. 2 and 4 of a further modified form of faucet valve.

Referring to FIGS. 1 and 2, faucet valve 40 shown is of conventional construction and includes a faucet body 41 having an inlet passage 42 and an outlet passage 43 communicating with the inlet passage 42. Faucet body 41 is formed with an internal thread 44 along the inlet passage 42 at the area of juncture of the inlet passage 42 with the outlet passage 43.

A valve body 45 has a threaded portion 46 adapted to engage a complementary threaded portion 47 in the faucet body 41. Conventionally, the valve body 45 has a peripheral flange 48 at the lower end thereof (FIG. 2) into which an annular washer of rubber or the like is positioned and conventionally a screw (not shown) is passed upwardly through an opening in the washer and engaged with threads 47 in an axial opening 49a on the lower end of the valve body 45 to retain the washer in position.

In accordance with the invention, a washer holder is provided which permits this conventional valve body, heretofore described, to be converted so that it will retain a washer in such a manner that a swivel action is provided and, at the same time, the corrosive action which normally occurs between metal-to-metal parts is substantially eliminated. Referring to FIGS. 2 and 3, the washer holder 50 comprises an annular central portion 51 having substantially parallel top to bottom faces and a bifurcated axial projection 52 which extends upwardly into the axial opening 50. Each part 52a of projection 52 extends upwardly and outwardly and has an enlarged semispherical upper end 52b. Each part 52a flexes intermediate its ends to hold the surface 52b in engagement with apexes of the threads 49 to retain the washer holder in position. The lower end 52c of projection 52 is enlarged and engages threads 49 upon lateral movement of the washer holder 50 to stabilize the washer holder 50 against such lateral movement.

The outer diameter of the central portion 51 of the washer holder is less than the inner diameter of the flanges 48. The washer holder also includes a secondary axial projection 53 which extends in the opposite direction from axial projection 52 and on which the washer 54 is positioned and held in frictional engagement, the outer diameter of the projection 53 being substantially equal to the inner diameter of the washer 54. The lower surface 55 of the washer is preferably beveled inwardly and downwardly. The axial projection 54 is also provided with an extremity 56 extending downwardly and serving to guide the washer holder with a new faucet rather than converting an older conventional faucet, the lower end of the valve body 45' is made flush as at 56 and the flange 48 is entirely eliminated. In such an arrangement, the washer holder 50' is provided with a peripheral flange 57 that takes the place of the flange 48 on the valve holder 45 (FIG. 2).

In both forms of the invention shown in FIGS. 2 and 3 and 4 and 5, the upper surface 58 of the washer holder is provided with raised portions 59, 60 that substantially reduce the contact area with the corresponding flat surface 56, 56' of the washer holder 45, 45' respectively.

In accordance with the invention, the washer holders are made of an organic plastic material which is inert to chemical action and electrolytic action with the chemicals that are conventionally used in the treatment of water, is abrasive resistant, has minimum tendency for cold flow and is relatively incompressible and rigid. A typical material comprises an acetal resin sold under the trademark Delrin.

By the above arrangement, the use of separate bearings is entirely eliminated, thus avoiding both the cost of materials and the cost of assembly of such bearings. Since metal bearings are entirely eliminated, the cost of non-corrosive materials which would prevent electrolytic action between metals is also eliminated. In practice, the lower end 19 of the valve body and the screw 29 may be made of stainless steel so that the corrosion is reduced to an absolute minimum.

In the form of the invention shown in FIG. 6, the washer holder 70 comprises a flat annular central portion 71 having a bifurcated axial projection 52 identical to that shown in FIGS. 2–5. The outer diameter of the central portion 71 of the washer holder is less than the inner diameter of the flanges 48.

The lower surface 73 of the secondary axial projection 74 is tapered downwardly and inwardly to facilitate insertion of the bib washer W which is of conventional rectangular construction and may be made of resilient material such as synthetic rubber. The outer diameter of the central portion 75 is preferably slightly greater than the inner diameter of the bib washer W and the axial dimension of the central portion 75 is slightly less than the thickness of the bib washer W so that when the bib washer is applied and passes the shoulder 76 which is formed at the area of juncture between the tapered portion and the central portion, it is compressed therebetween providing a seal against the outer surface of the central portion 75 and against the under surface of the flange portion. Thus, the shoulder 76 serves the dual function of holding the washer in position and at the same time providing a seal to prevent water from passing between the washer W and the underside of the central flange 71 and between the washer and the central portion 75. It has been found that any leakage of this type causes a washer to move upwardly and downwardly when the faucet is opened to and from sealing position producing a water hammer effect.

I claim:
1. A faucet valve comprising
a faucet body having an inlet and an outlet passage communicating with the inlet passage,
said faucet body including a valve seat at the area of juncture of the inlet passage and outlet passage,
a valve body,
means for mounting said valve body in said faucet body for movement toward and away from said seat,
a washer holder,
said washer holder being made of relatively incompressible plastic material such as acetal resin having low friction properties and being relatively non-deformable under sealing loads encountered in sealing,
said valve body having an axial threaded opening in the lower end thereof,
said washer holder having an integral central flange,
said washer holder having a first integral axial projection extending from one face of said central flange
said first axial projection being bifurcated to form two parts extending axially upwardly and outwardly,
each said part having an upper enlarged end with outwardly facing semi-spherical surfaces frictionally engaging the sides of said axial opening,
the portion of each said part intermediate its ends being of lesser cross section than the ends whereby each said part may flex intermediate its ends,
each said part having a lower enlarged end of greater cross section than said intermediate portion,
said lower enlarged ends being joined in an enlarged portion which has an outside diameter substantially equal to the outside diameter defined by the enlarged lower ends and which engages the sides of said axial opening upon lateral movement of the washer holder to stabilize the washer holder against said lateral movement,
said valve body having an annular bearing seat thereon,
said flange of said washer holder having a complementary bearing seat on said one face thereof —engaging said bearing seat on said valve body,
said flange having a substantially flat opposite face,
said washer holder having a second integral axial projection extending downwardly from the opposite face of said flange,
a washer made of resilient elastic material having a substantially flat upper surface and an opening therethrough,
said washer being telescoped over said second axial projection,
said axial projection having an intermediate portion thereof adjacent the opposite face of said flange over which said washer is telescoped which has an outer diameter slightly greater than the inner diameter of said washer,
said second axial projection having a shoulder intermediate its ends below said intermediate portion,
said washer engaging said shoulder,
the axial dimension of said intermediate portion be- tween said flange and said shoulder being slightly less than the thickness of said washer.

2. The combination set forth in claim 1 wherein said second axial projection includes a portion tapering downwardly and inwardly from said shoulder to facilitate insertion of said washer on said washer holder.

3. For use in a faucet valve comprising a faucet body having an inlet and an outlet passage communicating with the inlet passage, the faucet body including a valve seat at the area of juncture of the inlet passage and the outlet passage, a valve body, means for mounting the valve body in the faucet body for movement toward and away from the seat, said faucet body having an axial threaded opening and a substantially flat annular seat which normally receives a washer which is retained against said seat by a screw extending through an opening in the washer and threaded into said axial threaded opening, the improvement comprising a washer holder made of relatively incompressible plastic material such as acetal resin having low friction properties and being relatively non-deformable under sealing loads encountered in sealing, said washer holder having an integral central flange, said washer holder having a first integral axial projection extending from one face of said central flange, said first axial projection being bifurcated to form two parts extending axially upwardly and outwardly, each said part having an upper enlarged end with outwardly facing semi-spherical surfaces adapted to frictionally engage the sides of said axial opening, the portion of each said part intermediate its ends being of lesser cross section than the ends whereby each said part may flex intermediate its ends, each said part having a lower enlarged end of greater cross section than said intermediate portion, said lower enlarged ends being joined in an enlarged portion which has an outside diameter substantially equal to the outside diameter defined by the enlarged lower ends and which is adapted to engage the sides of said axial opening upon lateral movement of the washer holder to stabilize the washer holder against said lateral movement, said flange of said washer holder having a complementary bearing seat on said one face thereof engaging said seat on said valve body, said flange having a substantially flat opposite face, said washer holder having a second integral axial projection extending downwardly from the opposite face of said flange, a washer made of resilient elastic material having a substantially flat upper surface and an opening therethrough, said washer being telescoped over said second axial projection, said axial projection having an intermediate portion thereof adjacent the opposite face of said flange over which said washer is telescoped which has an outer diameter slightly greater than the inner diameter of said washer, said second axial projection having a shoulder intermediate its ends below said intermediate portion, said washer engaging said shoulder, the axial dimension of said intermediate portion between said flange and said shoulder being slightly less than the thickness of said washer.

4. The combination set forth in claim 3 wherein said second axial projection includes a portion tapering downwardly and inwardly from said shoulder to facilitate insertion of said washer on said washer holder.

5. The combination set forth in claim 2 wherein said second axial projection includes a lower cylindrical free end, said tapering portion extending upwardly from said cylindrical free end.

6. The combination set forth in claim 4 wherein said second axial projection includes a lower cylindrical free end, said tapering portion extending upwardly from said cylindrical free end.

References Cited

UNITED STATES PATENTS 2,315,948  4/1943  Esnard _____ 251—357

FOREIGN PATENTS 361,129  7/1938  Italy.
491,245  3/1953  Canada.
859,557  1/1961  Great Britain.
1,120,748  7/1956  France.

M. CARY NELSON, *Primary Examiner.*

A. ROSENTHAL, *Assistant Examiner.*